United States Patent
Pomianowski et al.

(10) Patent No.: US 10,659,784 B2
(45) Date of Patent: *May 19, 2020

(54) REGION-BASED IMAGE COMPRESSION

(71) Applicant: Advanced Micro Devices, Inc., Santa Clara, CA (US)

(72) Inventors: Andrew S. Pomianowski, Santa Clara, CA (US); Konstantine Iourcha, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,252

(22) Filed: Dec. 18, 2017

(65) Prior Publication Data

US 2018/0124404 A1 May 3, 2018

Related U.S. Application Data

(63) Continuation of application No. 14/683,279, filed on Apr. 10, 2015, now Pat. No. 9,848,192, which is a
(Continued)

(51) Int. Cl.
*G06K 9/46* (2006.01)
*H04N 19/124* (2014.01)
(Continued)

(52) U.S. Cl.
CPC ......... *H04N 19/124* (2014.11); *H04N 19/119* (2014.11); *H04N 19/12* (2014.11);
(Continued)

(58) Field of Classification Search
CPC ....... H04N 19/60; H04N 19/119; H04N 19/10
See application file for complete search history.

(56) References Cited

U.S. PATENT DOCUMENTS 5,144,423 A * 9/1992 Knauer ............... H04N 19/51
348/700
5,604,824 A * 2/1997 Chui ............... H04N 19/63
375/E7.044
(Continued)

FOREIGN PATENT DOCUMENTS

EP 0 785 688 A2 7/1997
EP 2 360 928 A1 8/2011
(Continued)

OTHER PUBLICATIONS

Space-Frequency—Directionlets, Vladan et al., IEEE, 1057-7149, 2007, pp. 1761-1773 (Year: 2007).*
(Continued)

*Primary Examiner* — Jayesh A Patel
(74) *Attorney, Agent, or Firm* — Volpe and Koenig, P.C.

(57) ABSTRACT

A method, apparatus, and a non-transitory computer readable medium for compressing an image including one or more regions are presented. An image is decomposed into one or more regions and a region is evaluated to determine whether the region meets a predetermined compressions acceptability criteria. In response to the region not meeting the predetermined compression acceptability criteria, the region is transformed and quantized. The region is then encoded in response to the transformed and quantized region meeting the predetermined compression acceptability criteria. In response to the transformed and quantized region not meeting the predetermined compression acceptability criteria, transformation and quantization settings are adjusted and the region is transformed and quantized using the adjusted settings. The region is then encoded in response to the predetermined compression acceptability criteria having been reached.

17 Claims, 5 Drawing Sheets

Related U.S. Application Data continuation of application No. 13/651,020, filed on Oct. 12, 2012, now Pat. No. 9,025,899.

(60) Provisional application No. 61/547,648, filed on Oct. 14, 2011.

(51) Int. Cl.

| | | |
|---|---|---|
| *H04N 19/119* | (2014.01) | |
| *H04N 19/46* | (2014.01) | |
| *H04N 19/196* | (2014.01) | |
| *H04N 19/122* | (2014.01) | |
| *H04N 19/96* | (2014.01) | |
| *H04N 19/12* | (2014.01) | |
| *H04N 19/17* | (2014.01) | |
| *H04N 19/194* | (2014.01) | |
| *H04N 19/587* | (2014.01) | |
| *H04N 19/60* | (2014.01) | |
| *H04N 19/146* | (2014.01) | |
| *H04N 19/154* | (2014.01) | |
| *H04N 19/10* | (2014.01) | |

(52) U.S. Cl.
CPC ........... *H04N 19/122* (2014.11); *H04N 19/17* (2014.11); *H04N 19/194* (2014.11); *H04N 19/196* (2014.11); *H04N 19/46* (2014.11); *H04N 19/587* (2014.11); *H04N 19/60* (2014.11); *H04N 19/96* (2014.11); *H04N 19/10* (2014.11); *H04N 19/146* (2014.11); *H04N 19/154* (2014.11)

(56) References Cited

U.S. PATENT DOCUMENTS

| | | | | |
|---|---|---|---|---|
| 6,044,115 | A * | 3/2000 | Horiike | H04N 19/176 375/240.05 |
| 6,185,253 | B1 * | 2/2001 | Pauls | H04N 19/176 375/240.02 |
| 6,396,958 | B1 * | 5/2002 | Wilson | H04N 19/60 375/E7.144 |
| 6,532,308 | B1 | 3/2003 | Goertzen | |
| 6,856,701 | B2 | 2/2005 | Karczewicz et al. | |
| 7,206,448 | B2 * | 4/2007 | Howard | H03M 7/40 382/170 |
| 9,025,899 | B2 * | 5/2015 | Pomianowski | H04N 19/119 382/240 |
| 9,848,192 | B2 * | 12/2017 | Pomianowski | H04N 19/119 |
| 2002/0094127 | A1 * | 7/2002 | Mitchell | H04N 19/176 382/250 |
| 2002/0143556 | A1 | 10/2002 | Kadatch | |
| 2003/0021486 | A1 | 1/2003 | Acharya | |
| 2004/0013202 | A1 * | 1/2004 | Lainema | H04N 19/126 375/240.18 |
| 2005/0025246 | A1 | 2/2005 | Holcomb | |
| 2005/0025369 | A1 * | 2/2005 | Shah | H04N 7/15 382/239 |
| 2005/0063562 | A1 * | 3/2005 | Brunk | G06K 9/00067 382/100 |
| 2005/0123282 | A1 | 6/2005 | Novotny | |
| 2005/0175092 | A1 * | 8/2005 | Puri | H04N 19/172 375/240.03 |
| 2005/0276323 | A1 | 12/2005 | Martemyanov et al. | |
| 2006/0018382 | A1 | 1/2006 | Shi | |
| 2007/0189621 | A1 | 8/2007 | Liu | |
| 2007/0242749 | A1 * | 10/2007 | Sung | H04N 19/139 375/240.16 |
| 2008/0037656 | A1 | 2/2008 | Hannuksela | |
| 2008/0117966 | A1 | 5/2008 | Topiwala | |
| 2009/0016624 | A1 * | 1/2009 | Sung | H04N 19/593 382/238 |
| 2009/0190654 | A1 | 7/2009 | Shimazaki et al. | |
| 2010/0226441 | A1 * | 9/2010 | Tung | H04N 21/2343 375/240.24 |
| 2011/0142137 | A1 | 6/2011 | Leigh et al. | |
| 2012/0176487 | A1 * | 7/2012 | Pinard | G06K 9/00127 348/79 |
| 2013/0083845 | A1 * | 4/2013 | Yu | H04N 19/197 375/240.03 |
| 2014/0037223 | A1 * | 2/2014 | Jiang | H04N 19/124 382/238 |
| 2014/0307781 | A1 * | 10/2014 | He | H04N 19/196 375/240.03 |
| 2015/0133214 | A1 * | 5/2015 | Heath | A63F 13/355 463/31 |

FOREIGN PATENT DOCUMENTS

| | | | | |
|---|---|---|---|---|
| EP | 2360928 A1 * | 8/2011 | | H04N 19/18 |
| JP | H02-84895 A | 3/1990 | | |
| JP | 2010-035189 A | 2/2010 | | |
| KR | 10-0355375 B1 | 12/2002 | | |
| KR | 10-2010-0005224 A | 1/2010 | | |
| WO | 2008027413 A2 | 3/2008 | | |
| WO | 2011/125313 A1 | 10/2011 | | |

OTHER PUBLICATIONS

Kim, I.K., et al., "Rate-distoration optimization of the image compression algorithm based on the warped discrete cosine transform," Signal Proceesing, vol. 83, No. 9, Sep. 2003, Elsevier B.V. (10 pages).

Han, W.J., "Improved Video Compression Efficiency Through Flexible Unit Representation and Corresponding Extension of Coding Tools," IEEE Transactions on Circuits and Systems for Video Technology, vol. 20, No. 12, Dec. 2010 (12 pages).

"Fast mode decision and motion estimation for JVT/H.264", Proceedings, 2003 International Conference on Image Processing, 2003. ICIP 2003, vol. 3, Sep. 17, 2003, pp. III-853-III-856.

"Improved Video Compression Efficiency Through Flexible Unit Representation and Corresponding Extension of Coding Tools", IEEE Transactions on Circuits and Systems for Video Technology, vol. 20, Issue 12, Dec. 1, 2010, pp. 1709-1720.

* cited by examiner

500

REGION-BASED IMAGE COMPRESSION

CROSS REFERENCE TO RELATED APPLICATIONS

This application is a continuation of U.S. patent application Ser. No. 14/683,279, filed Apr. 10, 2015, which is a continuation of U.S. patent application Ser. No. 13/651,020, filed Oct. 12, 2012, which issued on May 5, 2015 as U.S. Pat. No. 9,025,899, which claims the benefit of U.S. Provisional Patent Application No. 61/547,648, filed Oct. 14, 2011, the contents of which are hereby incorporated by reference as if fully set forth herein.

FIELD OF INVENTION

The present invention is generally directed to image compression and in particular, to a method for region-based image compression.

BACKGROUND

Lossy compression techniques require methods to effectively encode images at lower bit rates without sacrificing significant image quality. Fixed rate compression schemes generally have poor image quality at rates significantly below four bits per pixel. Some existing variable rate compression techniques, like Joint Photographic Experts Group (JPEG), apply some form of transform and quantization.

Some methods of reducing the amount of data to be stored after compression may involve storing the data in a sparse manner and interpolating the results. Existing methods generally have not provided good levels of image quality, and in some cases, may also introduce potentially undesired image artifacts (e.g., high frequency noise).

SUMMARY OF EMBODIMENTS

Adding a local per-region transform and quantization step before subsequent compression steps may reduce the amount of data to be compressed, thereby reducing the required bit rate needed to maintain a high level of image quality. During decompression, a reconstruction transformation is applied to generate the pixel values. Overall, performing a per-region transform and quantization permits better tradeoffs to be made in attaining low bit rates with high image quality, without adding unmanageable complexity to the image decoding.

Some embodiments provide a method for decompressing an image, the image including one or more regions. A region of the image is selected to be decoded. The region and metadata associated with the region are decoded, the metadata including transformation and quantization settings used to compress the region. A reconstruction transformation is applied to the region using the transformation and quantization settings.

Some embodiments provide a non-transitory computer-readable storage medium storing a set of instructions for execution by a general purpose computer to decompress an image, the image including one or more regions. The set of instructions includes a selecting code segment, a decoding code segment, and an applying code segment. The selecting code segment selects a region of the image to decode. The decoding code segment decodes the region and metadata associated with the region, the metadata including transformation and quantization settings used to compress the region. The applying code segment applies a reconstruction transformation to the region using the transformation and quantization settings.

Some embodiments provide a method for decompressing an image, the image including one or more regions, each region including one or more subregions. A region of the image is selected to be decoded, and a subregion of the selected region is selected to be decoded. The subregion and metadata associated with the subregion are decoded, the metadata including transformation and quantization settings used to compress the subregion. A reconstruction transformation is applied to the subregion using the transformation and quantization settings.

Some embodiments provide a non-transitory computer-readable storage medium storing a set of instructions for execution by a general purpose computer to decompress an image, the image including one or more regions, each region including one or more subregions. The set of instructions includes a first selecting code segment, a second selecting code segment, a decoding code segment, and an applying code segment. The first selecting code segment selects a region of the image to decode. The second selecting code segment selects a subregion of the region to decode. The decoding code segment decodes the subregion and metadata associated with the subregion, the metadata including transformation and quantization settings used to compress the subregion. The applying code segment applies a reconstruction transformation to the subregion using the transformation and quantization settings.

BRIEF DESCRIPTION OF THE DRAWINGS

A more detailed understanding may be had from the following description, given by way of example in conjunction with the accompanying drawings, wherein.

DETAILED DESCRIPTION

Fixed-rate block-based compression techniques require methods to effectively encode images at low bit rates without sacrificing significant image quality. Adding a local per-region transform and quantization step in front of any subsequent encoding and/or compression steps reduces the amount of data to be encoded and/or compressed to retain image quality while achieving a desired target bit rate. To decompress the region, the compressed data may first be fully or partially decompressed according to the underlying compression scheme (depending on the implementation). The reconstruction transformation is then applied to produce the approximation to the original uncompressed data. If any coefficients were discarded during quantization, those coefficients are assumed to be zero for the purposes of the reconstruction transformation.

Figure 1:
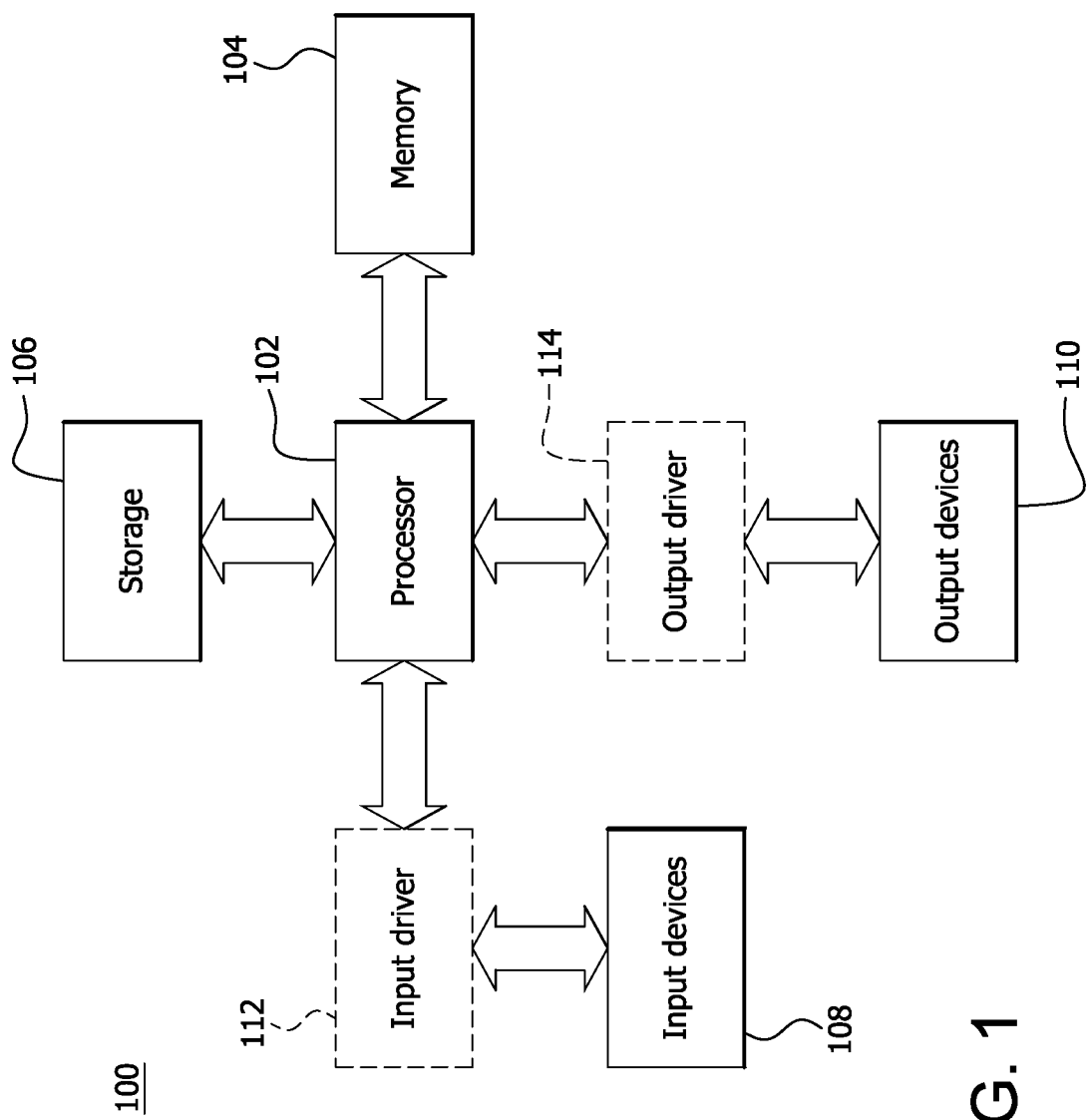
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
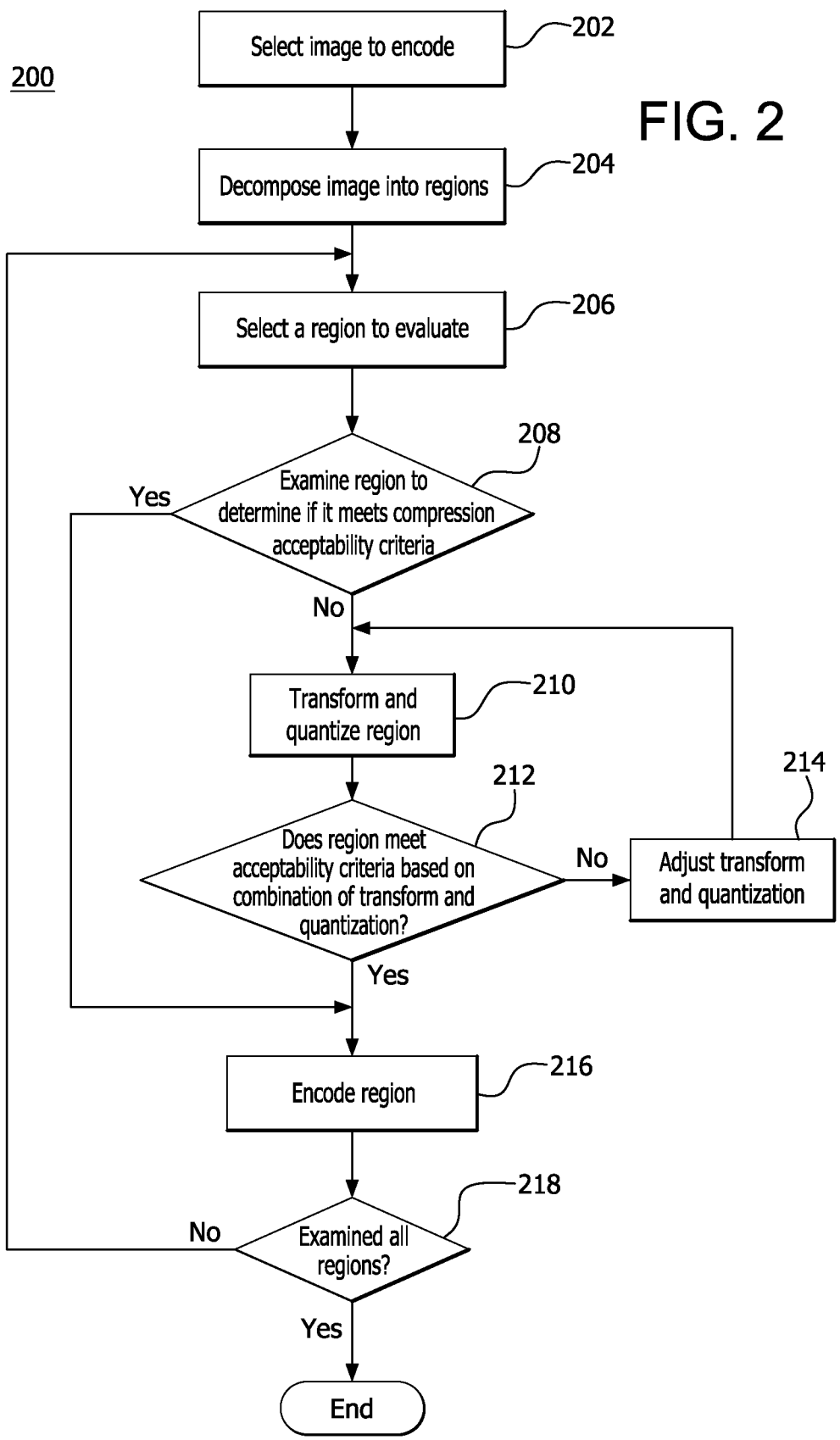
FIG. 2 is a flow chart of a method for compressing an image.

FIG. 2 is a flow chart of a method 200 for compressing an image. An image to be encoded is selected (step 202) and the selected image is decomposed into several regions according to a predetermined method (step 204). The regions may be a fixed size or a variable size, and the decomposing method may be hierarchical. It is noted that the particular method used to decompose the image into regions does not affect the overall operation of the method 200.

A region is selected for evaluation (step 206) and is examined to determine if the region meets a predetermined compression acceptability criteria (step 208). The predetermined compression acceptability criteria may include, but is not limited to, a specific bit rate, a specific image quality, or combinations thereof. It may be possible to encode the region to meet the predetermined compression acceptability criteria using the basic underlying compression system. In this case, no additional transform and quantization step is required, and the region can be processed directly in the encoding stage. This may be viewed as a special case where the transform is the identity transform.

If the region does not meet the predetermined compression acceptability criteria (step 208), then several refinements may be performed. The region is transformed and quantized (step 210). If the method determines that the region needs to be transformed and quantized to satisfy predefined compression acceptability criteria, then the method selects the transform and quantization from a predefined set. In one embodiment, the set may include only linear transforms, for example filtering with a smoothing kernel, wavelet transforms, curvelet transforms, Gabor wavelet transforms, etc. In another embodiment, the set may include non-linear transforms.

As part of its optimization procedure, the encoder may evaluate multiple potential combinations of transform and quantization, selecting the combination that achieves the highest quality at the predetermined compression acceptability criteria. The encoder may have parameters to control the extent of any optimization steps at this stage to tradeoff overall compression quality against encoding performance. These controls may limit the extent of the search for optimal transforms and quantizations, and may also provide threshold values, permitting the technique to exit early when certain targets are reached.

Quantization is performed by taking the coefficients output from the transform and rounding them to a predefined set of values, and the set may be different for each coefficient. In some embodiments, sets of the values corresponding to some of the coefficients may consist of a single value of zero, which means that the corresponding coefficients are discarded (such as in downsampling). After quantization, the remaining coefficients are encoded.

It is then determined whether the region meets the predetermined compression acceptability criteria based on a combination of transform and quantization (step 212). If the region does not meet the predetermined compression acceptability criteria, then the transform and quantization settings may be adjusted (step 214) and the adjusted region is transformed and quantized with the adjusted settings (step 210).

After optimizing the transformation and quantization, and the region meets the predetermined compression acceptability criteria or all candidate settings have been evaluated and the best settings are chosen (steps 208 or 212), the region is encoded (step 216). The encoding may incorporate some underlying compression. For each region, the output data format includes some metadata to be stored and/or transmitted with the region, to indicate the transform and the quantization applied for that region and other information that may be required for decoding. In addition, the encoded region may be transmitted (not shown in FIG. 2). If all of the regions of the image have not been examined (step 218), then the method continues by selecting another region to evaluate (step 206). If all of the regions of the image have been examined (step 218), then the method terminates.

In a specific implementation of the method 200 (not shown), the transform and quantization in step 210 may be configured to be a downscaling operation. A region that is to be compressed is evaluated and downscaled with a selected aspect ratio (which encompasses the transform and quantization) prior to compression, to reduce the total number of pixels in the region while retaining as much of the information as possible. Performing the downscaling reduces the amount of data prior to encoding, allowing the encoding (which may include additional compression steps) to occur with a higher accuracy for a given bit rate. One of a set of different aspect ratios may be selected for downscaling the region. The selected aspect ratio provides the best results according to a selected error metric (for example, peak signal to noise ratio) by evaluating the results of quantizing to each possible ratio against this metric for the current region.

In one implementation, the target bit rate is known (for example, in a fixed-rate compression scheme), and the amount of space available at the target bit rate can be calculated. With this information, there may be multiple ways a region could be scaled to fit in the available space. During downscaling, some of the high-frequency image information is discarded, effectively blurring the region. Depending on the content of the original region, the choice of the scaling aspect ratio may have a significant impact on preserving the image quality. By applying a non-uniform scaling to the original data, more of the important information in the original image can be preserved. By having a different level of scaling for each region, the compression can respond to local characteristics in the image content for different regions. The implementation may potentially examine multiple possible choices of transform and quantization for each region in the image to optimize the predetermined compression acceptability criteria.

Figure 3:
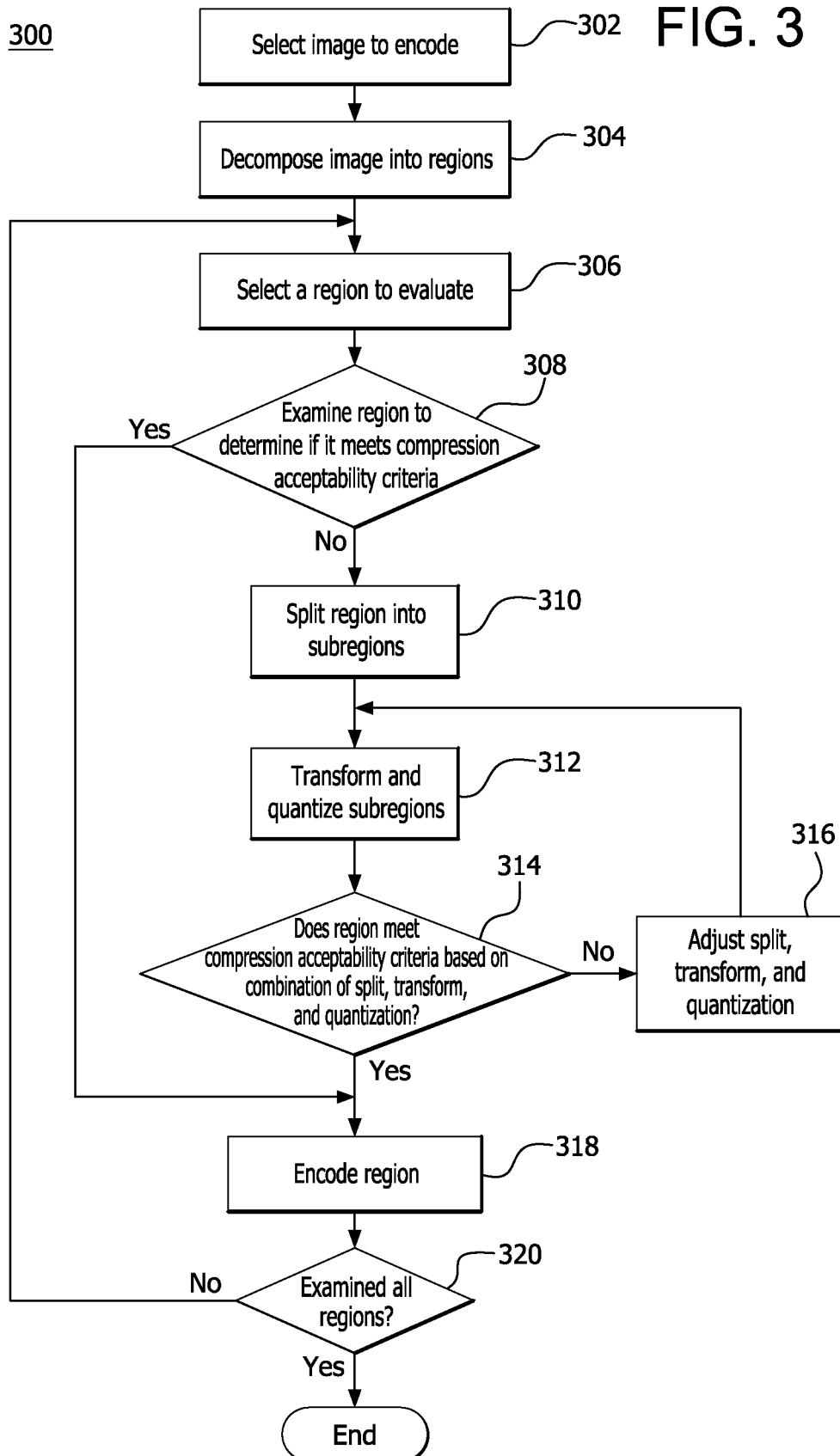
FIG. 3 is a flow chart of an alternate method for compressing an image.

FIG. 3 is a flow chart of an alternate method 300 for compressing an image. An image to be encoded is selected (step 302) and the selected image is decomposed into several regions according to a predetermined method (step 304). The regions may be a fixed size or a variable size, and the decomposing method may be hierarchical. It is noted that the particular method used to decompose the image into regions does not affect the overall operation of the method 300.

A region is selected for evaluation (step 306) and is examined to determine if the region meets a predetermined compression acceptability criteria (step 308). The predetermined compression acceptability criteria may include, but is not limited to, a specific bit rate, a specific image quality, or combinations thereof. It may be possible to encode the region to meet the predetermined compression acceptability criteria using the basic underlying compression system. In this case, no transform and quantization step is required, and the region can be processed by the underlying compression scheme. This may be viewed as a special case where the transform is the identity transform.

If the region does not meet the predetermined compression acceptability criteria (step 308), then several refinements may be performed. The region is split into subregions (step 310), and the subregions are transformed and quantized (step 312). If the encoder determines that the region needs to be split, transformed, and quantized to satisfy the predetermined compression acceptability criteria, then the encoder selects a split, transform, and quantization from a set of predefined splits, transforms, and quantizations. In one embodiment, the set may include only linear transforms, for example filtering with a smoothing kernel, wavelet transforms, curvelet transforms, Gabor wavelet transforms, etc. In another embodiment, the set may include non-linear transforms.

As part of its optimization procedure, the encoder may evaluate multiple potential combinations of region split (how the region is split into subregions), transform, and quantization, selecting the combination that achieves the highest quality to meet the predetermined compression acceptability criteria. The encoder may have parameters to control the extent of any optimization steps at this stage to tradeoff overall compression quality against encoding performance. These controls may limit the extent of the search for optimal regions, subregion splits, transforms, and quantizations, and may also provide threshold values, permitting the technique to exit early when certain targets are reached.

It is then determined whether the region meets the predetermined compression acceptability criteria based on a combination of split, transform, and quantization (step 314). If the region does not meet the predetermined compression acceptability criteria, then the split (how the region is split into subregions), transform, and/or quantization may be adjusted (step 316) and the adjusted subregions are transformed and quantized (step 312) based on the adjustment(s). If the split is adjusted (step 316), a different splitting technique may be used to generate alternative region splits that may result in achieving the predetermined compression acceptability criteria.

After optimizing the region split, transformation, and quantization, and the region meets the predetermined compression acceptability criteria and/or other termination conditions for this processing (steps 308 or 314), the region is encoded (step 318). The encoding may incorporate some underlying compression. For each region, the output data format includes some metadata to be stored and/or transmitted with the region, to indicate the region split, the transform, and the quantization applied for that region and other information that may be required for decoding. In addition, the encoded region may be transmitted (not shown in FIG. 3). If all of the regions of the image have not been examined (step 320), then the method continues by selecting another region to evaluate (step 306). If all of the regions of the image have been examined (step 320), then the method terminates.

Figure 4:
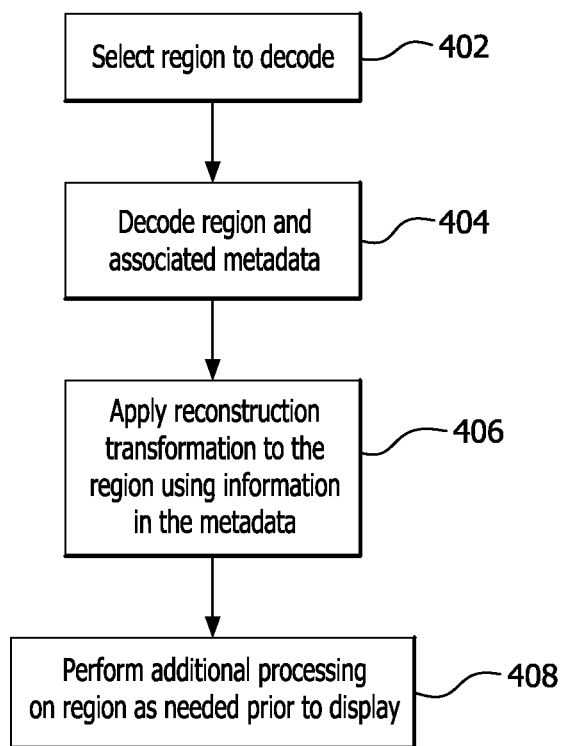
FIG. 4 is a flow chart of a method for decompressing a region of an image.

FIG. 4 is a flow chart of a method 400 for decompressing a region of an image. A region of the image is selected for decoding (step 402), and the selected region and its associated metadata are decoded (step 404). A reconstruction transformation is applied to the region using information included in the metadata (step 406). Additional processing is then performed on the region as needed prior to displaying the image (step 408). Examples of the additional processing may include, for example, texture mapping operations, etc.

In an alternate embodiment of the method 400 (not shown) the region may be split into subregions. The subregions may share a single transform and quantization (specified for the whole region), or each subregion may have its own individual transform and quantization specified.

In an alternate embodiment of the method 400 (not shown), step 406 may be an upscaling operation, if the region was downscaled during encoding. The data is expanded according to the underlying compression method for the region. The region is then upscaled using information included in the metadata describing the aspect ratio used for the downscaling (step 406). The upscaling may use any applicable filter, but to preserve image quality, the encoder needs to know what filter will be used by the decoder, as this allows the compression quality to be tuned more precisely. In a hardware implementation, the upscaling filter may be bilinear, because this filter is simple and cheap to implement. Other types of upscaling filters may be used without substantially altering the operation of the method 400. In addition, the type of filter used for upscaling may be uniform over the entire image or may be selected independently for each region of the image.

In one implementation of this embodiment, the encoder uses a fixed-rate region-based compression scheme with a given region size, e.g., 8×8. Each region is compressed independently. If it is not possible to encode every pixel in the region explicitly at the required bit rate, then the region is downscaled by a predetermined ratio prior to compression. For example, the 8×8 region may be reduced in size to 8×6, which would reduce the amount of pixel information that needs to be stored by 25%. The level of information reduction is chosen to allow the region to be encoded at the desired compression acceptability criteria. The downscaling may be accomplished by any appropriate method, with higher quality methods being used to retain more useful information.

For a given amount of final information, there may be several different ways of scaling the region to reduce the amount of information that needs to be stored by a similar amount. For example, 8×6, 7×7, and 6×8 sets of pixels all require approximately the same amount of final data to encode. For each region, the encoder may try different ratios, and use the ratio that provides the best image quality in terms of the predetermined compression acceptability criteria (selecting from the multiple different quantizations).

In some regions of the image, it is noted that the method may choose to use a higher level of downscaling (e.g., 8×5, 8×4, 6×5, etc.) and evaluate these ratios in conjunction with the encoder using back-end compression schemes that have a lower compression rate. By reducing the number of unique pixels that need to be stored, the remaining pixels may be encoded with a higher accuracy (i.e., a lower compression rate), while achieving the same predetermined compression acceptability criteria. In smooth regions of an image, it may be advantageous to use these higher levels of downscaling while encoding the final pixels at higher precision. Conversely, in some regions (for example, those regions with more high-frequency content), it may be more optimal in terms of image quality to use minimal or no scaling (quantization), and instead use a higher rate of back-end compression.

One extension to this embodiment is to downsample information along a selected vector direction, to preserve more of the image quality in the region (rather than the approximation achieved using downsampling aligned to the X and Y axes but with a variable aspect ratio). In this case, the quantization could be the same as above, but the transform is now different. This extension may allow better preservation of detail in regions of the image where the high frequency content is aligned closer to the diagonals. For example, if an image can be downscaled with knowledge of the direction of motion in the image (if any), then the high-frequency information orthogonal to the direction of the motion can be retained, while other information may be discarded.

A second extension to this embodiment is to subdivide the original region further into subregions, and independently scale each subregion (select a different transform and quantization for each subset) to better match the characteristics of the region to provide a higher image quality.

Figure 5:
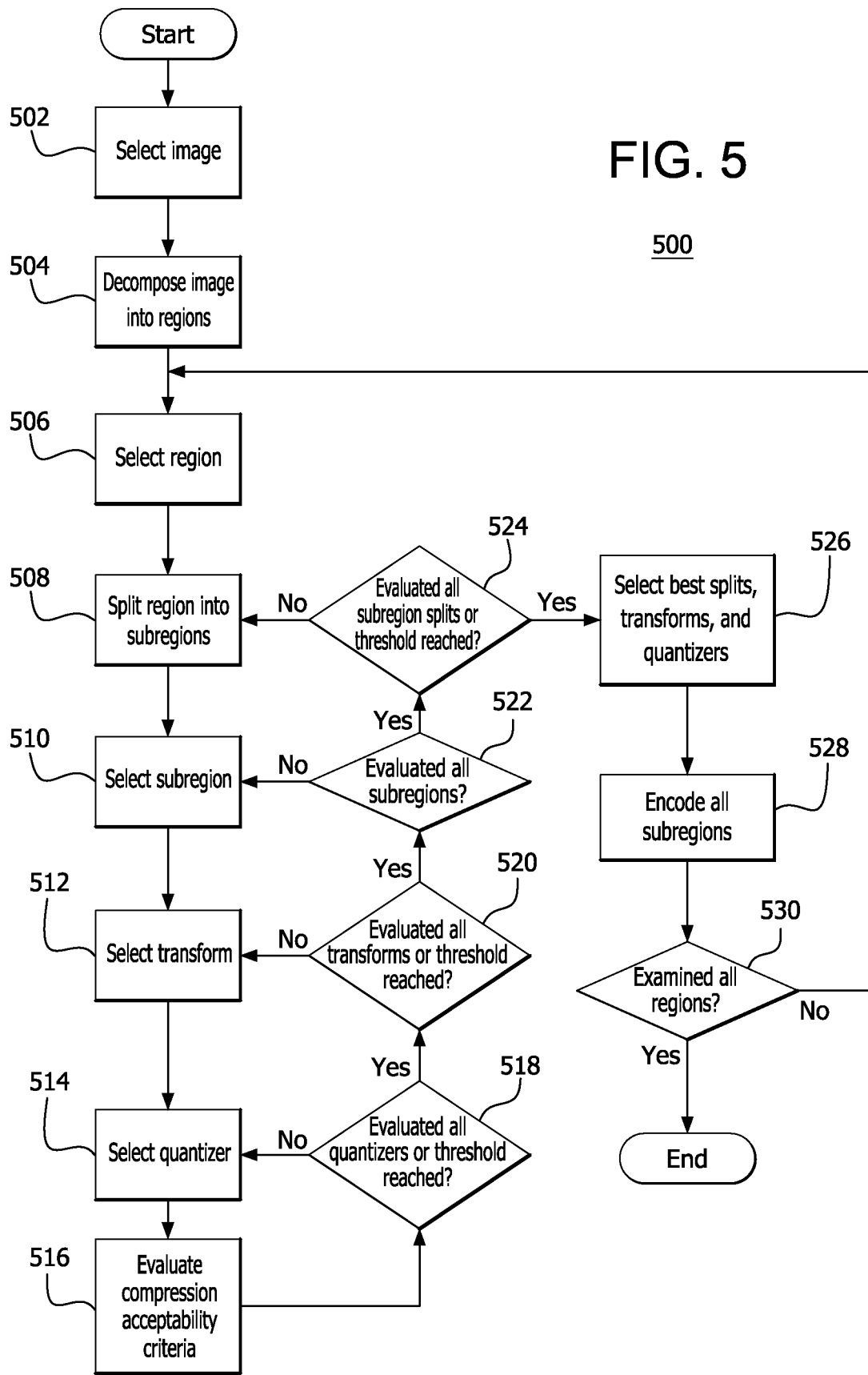
FIG. 5 is a flow chart of a method for compressing an image that evaluates combinations of transforms and quantizers.

FIG. 5 is a flow chart of a method 500 for compressing an image that evaluates combinations of regions, subregions, transforms, and quantizers. An image to be encoded is selected (step 502) and the selected image is decomposed into regions (step 504). A region of the image is selected (step 506). To evaluate the selected region of the image, the selected region is split into subregions (step 508), a subregion is selected (step 510), a transform is selected (step 512), and a quantizer is selected (step 514). Based on the selected subregion, transform, and quantizer, the selected subregion of the image is processed and evaluated to determine whether it meets predetermined compression acceptability criteria (step 516). It is noted that the selection of the split (step 508), transform (step 512), and quantizer (step 514) may be performed in any order without affecting the overall operation of the method 500. Optionally, the compression acceptability criteria that are determined by the selected subregion split, transform, and quantizer may be stored for later comparison.

To ensure that the best possible combination of split, transform, and quantizer are chosen for the selected region, all of the splits, transforms, and quantizers will be evaluated. It should be understood that in an optimized embodiment, the method may not exhaustively enumerate all combinations of region split, subregion split, transform, and quantizer, but may use an optimized search approach to produce the same or similar result.

If all of the quantizers have not been evaluated or a threshold compression acceptability criteria has not been reached (step 518), then another quantizer is selected (step 514) and processing continues as described above. If all of the quantizers have been evaluated or if the threshold compression acceptability criteria has been reached (step 518), then a determination is made whether all of the transforms have been evaluated or the threshold compression acceptability criteria has been reached (step 520).

If all of the transforms have not been evaluated or the threshold compression acceptability criteria has not been reached (step 520), then another transform is selected (step 512) and processing continues as described above. If all of the transforms have been evaluated or the threshold compression acceptability criteria has been reached (step 520), then a determination is made whether all subregions have been evaluated (step 522).

If all of the subregions of the region have not been evaluated (step 522), then another subregion of the region is selected (step 510) and processing continues as described above. If all of the subregions have been evaluated (step 522), then a determination is made whether all of the subregion splits have been evaluated or the threshold compression acceptability criteria has been reached (step 524).

If all of the subregion splits have not been evaluated and the threshold compression acceptability criteria has not been reached (step 524), then the region is split into different subregions (step 508) and processing continues as described above. In an alternative embodiment (not shown), the threshold compression acceptability criteria defined in steps 518, 520, and 524 may not be used.

After all combinations of splits, transforms, and quantizers have been evaluated or the threshold compression acceptability criteria for the selected region has been reached, the best splits, transforms, and quantizers are selected (step 526). All of the subregions of the region are encoded using the best subregion splits, transforms, and quantizers (step 528). In one implementation, the encoding in step 528 may also include additional compression. For each region, the output data format includes some metadata to be stored and/or transmitted with the region, to indicate the subregion splits, transforms, and quantizers applied for that region and other information that may be required for decoding.

Next, a determination is made whether all of the regions of the image have been examined (step 530). If all of the regions of the image have not been examined, then another region of the image is selected (step 506) and processing continues as described above. If all of the regions of the image have been examined (step 530), then the method terminates.

Other embodiments are possible, where the transformation and quantization are tightly coupled with the final encoding, and also with the implementation of the decoding. In addition to the following two examples, other embodiments are possible.

In a first example embodiment, texture filtering operations will be performed on the decoded data, so an upscaling filter may be implemented by manipulating the texture filtering hardware, rather than by implementing an additional dedicated upscaler.

In a second example embodiment, the underlying compression (encoding) generates index coefficients that are used to select colors. In this case, the transformation and quantization may be performed on the index coefficients produced by the underlying encoder, rather than on the original color data. In this embodiment, the region is compressed prior to the region being transformed and quantized.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. An apparatus for compressing an image, comprising:
an encoder configured to:
decompose the image into one or more regions;
select a region of the image to evaluate;
determine whether a respective region from the one or more regions does not meet a predetermined compression acceptability criteria;
in response to the respective region not meeting the predetermined compression acceptability criteria:
transform and quantize the respective region to form a transformed and quantized region;
determine whether or not the transformed and quantized region meets the predetermined compression acceptability criteria;
in response to the transformed and quantized region meeting the predetermined compression acceptability criteria:
encode the transformed and quantized region to form an encoded region; and
in response to the transformed and quantized region not meeting the predetermined compression acceptability criteria:
determine adjusted transformation and quantization settings that satisfy the predetermined compression acceptability criteria when applied to the transformed and quantized region,
form an adjusted transformed and quantized region by transforming and quantizing the transformed and quantized region using the adjusted transformation and quantization settings, and
encode the adjusted transformed and quantized region to form the encoded region.

2. The apparatus according to claim 1, wherein the encoder is further configured to decompose the image into one or more regions having a fixed size and shape.

3. The apparatus according to claim 1, wherein the encoder is further configured to decompose the image into one or more regions having a variable size and shape.

4. The apparatus according to claim 1, wherein the encoder is further configured to implement the transform and quantization by performing a downscaling operation of the respective region with a selected aspect ratio.

5. The apparatus according to claim 4, wherein the encoder is further configured to:
compress each region after downscaling using a fixed or variable bit rate compression scheme.

6. The apparatus according to claim 5, wherein for each region, the encoder is further configured to select from a set of available compression methods, with each compression method associated with a set of possible scaling aspect ratios that meet a specific compression acceptability criteria.

7. The apparatus according to claim 1, wherein the encoder is further configured to apply additional levels of compression.

8. The apparatus according to claim 1, wherein the encoder is further configured to store metadata with the encoded region, the metadata indicating the transformation and quantization applied for the respective region.

9. An apparatus for compressing an image, comprising:
an encoder configured to:
decompose the image into one or more regions;
select a selected region from the one or more regions to evaluate;
determine whether the selected region does not meet a predetermined compression acceptability criteria; and
in response to the selected region not meeting the predetermined compression acceptability criteria:
split the selected region into subregions;
form transformed and quantized subregions by transforming and quantizing the subregions;
determine whether or not the selected region meets the predetermined compression acceptability criteria based on the transformed and quantized sub-regions;
in response to the selected region meeting the predetermined compression acceptability criteria based on a combination of the split, transform, and quantization, encode the transformed and quantized subregions to form an encoded region; and
in response to the selected region not meeting the predetermined compression acceptability criteria:
determine an adjusted split, transformation, and quantization settings that satisfy the predetermined compression acceptability criteria when applied to the subregions;
form an adjusted split, transformed, and quantized subregions by transforming, and quantizing the subregions using the adjusted split, transformation, and quantization settings; and
encode the subregions to form the encoded region based on the adjusted split, transformed, and quantized subregions.

10. The apparatus of claim 9, wherein each of the one or more regions has a fixed size and shape.

11. The apparatus of claim 9, wherein each of the one or more regions has a variable size and shape.

12. The apparatus of claim 9, wherein the transform and quantization implements a downscaling operation of the selected region with a selected aspect ratio.

13. The apparatus according to claim 12, wherein the encoder is further configured to compress each region after downscaling using a fixed or variable bit rate compression scheme.

14. The apparatus according to claim 13, wherein for each region, the encoder is further configured to select from a set of available compression methods, with each compression method associated with a set of possible scaling aspect ratios that meet a specific compression acceptability criteria.

15. The apparatus according to claim 9, wherein the encoder is further configured to apply additional levels of compression.

16. The apparatus according to claim 9, wherein the encoder is further configured to store metadata with the encoded region, the metadata indicating the transformation and quantization applied for the selected region.

17. An apparatus for compressing an image, comprising:
an encoder configured to:
decompose the image into one or more regions;
select a selected region from the one or more regions to evaluate;
split the selected region into subregions;
select a subregion, a transform, and a quantizer for each subregion;
process the selected region using the subregion, the transform, and the quantizer selected for each subregion to form a processed selected region;
determine whether or not the processed selected region meets a predetermined compression acceptability criteria;
in response to the processed selected region meeting the predetermined compression acceptability criteria:
encode the processed selected region to form an encoded region; and
in response to the processed selected region not meeting the predetermined compression acceptability criteria:
determine adjusted settings that satisfy the predetermined compression acceptability criteria when applied to the processed selected region, wherein the adjusted settings include settings for any one or a combination of the subregion, subregion split, transform, and quantizer;
form an adjusted selected region by transforming and quantizing the processed selected region using the adjusted settings; and
encode the adjusted selected region to form the encoded region.

* * * * *